United States Patent [19]

Rowan et al.

[11] 4,343,511
[45] Aug. 10, 1982

[54] SILAGE WAGON

[76] Inventors: Robert A. Rowan; Leroy Mathis, both of P.O. Box 68, Enigma, Ga. 31749

[21] Appl. No.: 182,107

[22] Filed: Aug. 28, 1980

[51] Int. Cl.$^3$ ............................................. B60P 1/56
[52] U.S. Cl. ..................................... 298/6; 292/254; 298/30; 298/38; 406/163
[58] Field of Search .................. 298/23 F, 24, 5, 6, 298/25, 26, 27, 29, 30, 38; 414/343, 345; 296/15, 56, 184; 105/254, 283; 406/157, 163; 292/254

[56] References Cited

U.S. PATENT DOCUMENTS

| | | | |
|---|---|---|---|
| 2,901,288 | 8/1959 | Gilpatrick | 298/30 |
| 3,235,061 | 2/1966 | Craig | 198/641 |
| 3,351,384 | 11/1967 | Huck | 298/6 X |
| 3,478,902 | 11/1969 | Anderson et al. | 298/5 X |
| 4,068,892 | 1/1978 | Welch | 296/56 X |

FOREIGN PATENT DOCUMENTS 651808 4/1951 United Kingdom .
860832 2/1961 United Kingdom .
875643 8/1961 United Kingdom .

Primary Examiner—Leslie J. Paperner
Attorney, Agent, or Firm—Newton, Hopkins & Ormsby

[57] ABSTRACT

A high capacity wagon for silage and the like has a gravity-assisted rear inclined dumping wall with high ground clearance in both the full open and all intermediate positions. A simplified positive latch mechanism for the dumping wall is biased in the latching position and easily released by the operator of a towing tractor. The necessity for tilting the entire body of the wagon to completely dump its contents is eliminated.

4 Claims, 7 Drawing Figures

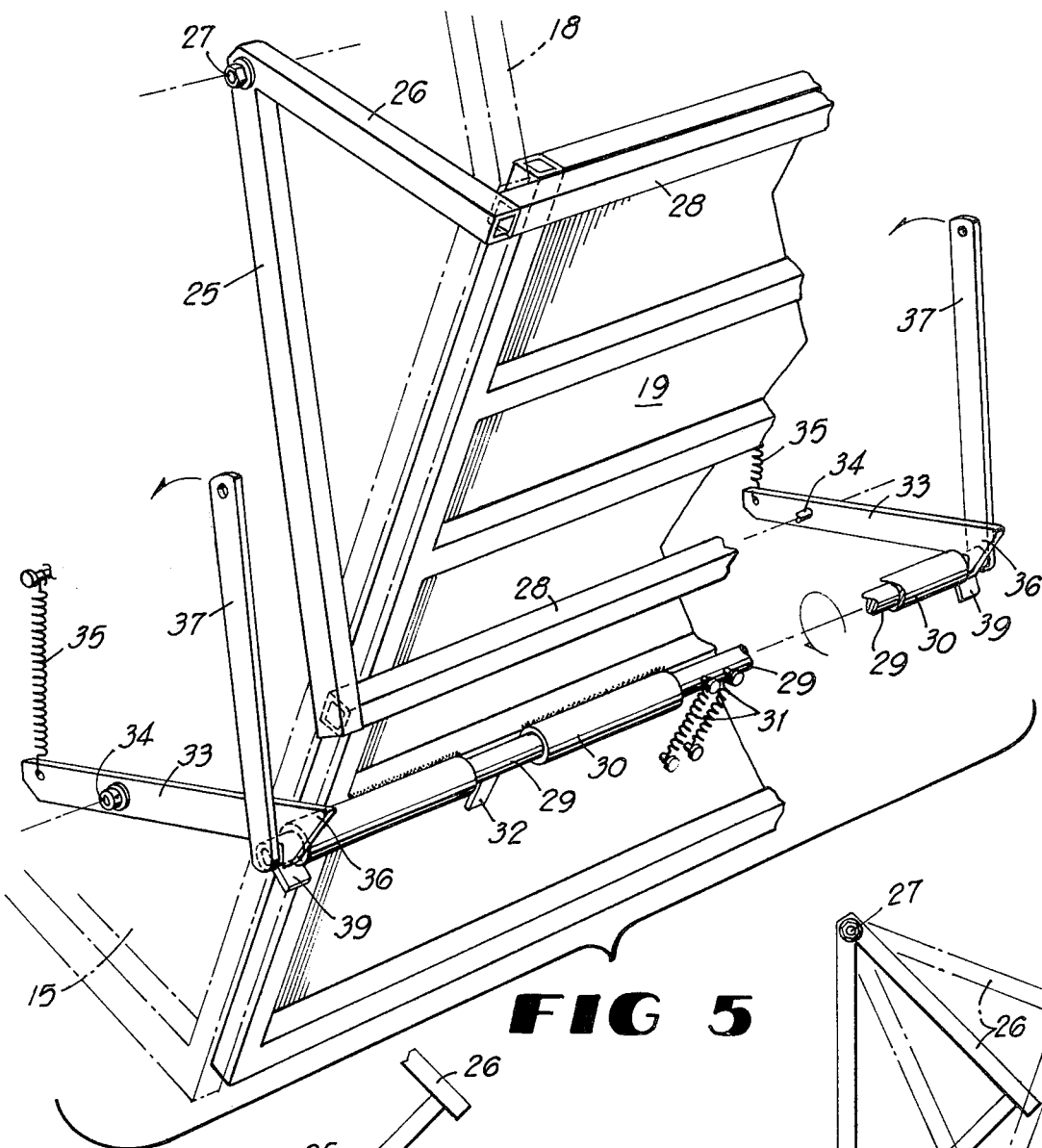
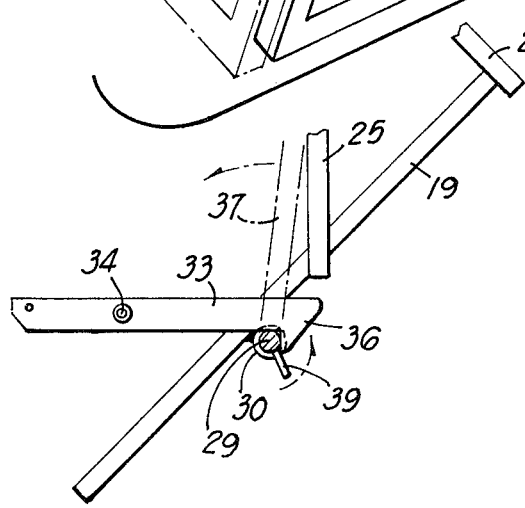
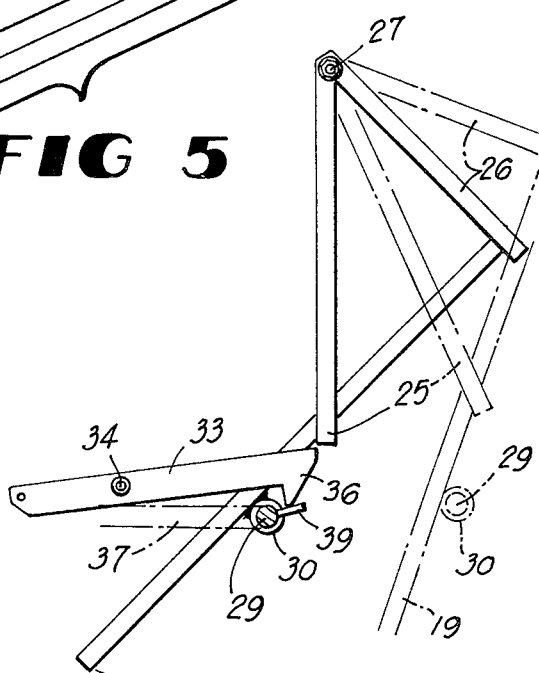
FIG 5
FIG 6
FIG 7

SILAGE WAGON

BACKGROUND OF THE INVENTION

In the prior art, dumping wagons and trucks of various types are known. Generally, such devices have rectangular bodies which require tilting in order to dump their contents completely. In cases where the wagon bodies are non-tiltable, it is necessary to provide some means to force the contents of the truck or wagon from the body thereof when discharge gates are in an open position.

The present invention has for its objective to improve on the known prior art by providing a full dumping vehicle of highest capacity which can be towed behind a tractor and dumped at any location without the necessity for tilting the body of the device. The wagon body is of generally triangular configuration with its apex lowermost and full dumping is facilitated with the assistance of gravity acting through the load on an inclined rear hinged wall of the vehicle, which, upon release of a biased latching device, swings rearwardly and upwardly on the transverse axis of a hinge structure which is disposed forwardly of the top of the rear dumping wall. The vehicle is characterized by extreme simplicity, ruggedness and comparative low cost of manufacture.

Other features and advantages of the invention will become apparent during the course of the following detailed description.

BRIEF DESCRIPTION OF THE DRAWINGS

FIG. 5 is a rear fragmentary perspective view of the wagon showing rear wall latching means and associated elements.

FIGS. 6 and 7 are fragmentary side elevational views of the latching means and rear dumping wall in latched and released positions.

DETAILED DESCRIPTION

Figure 1:
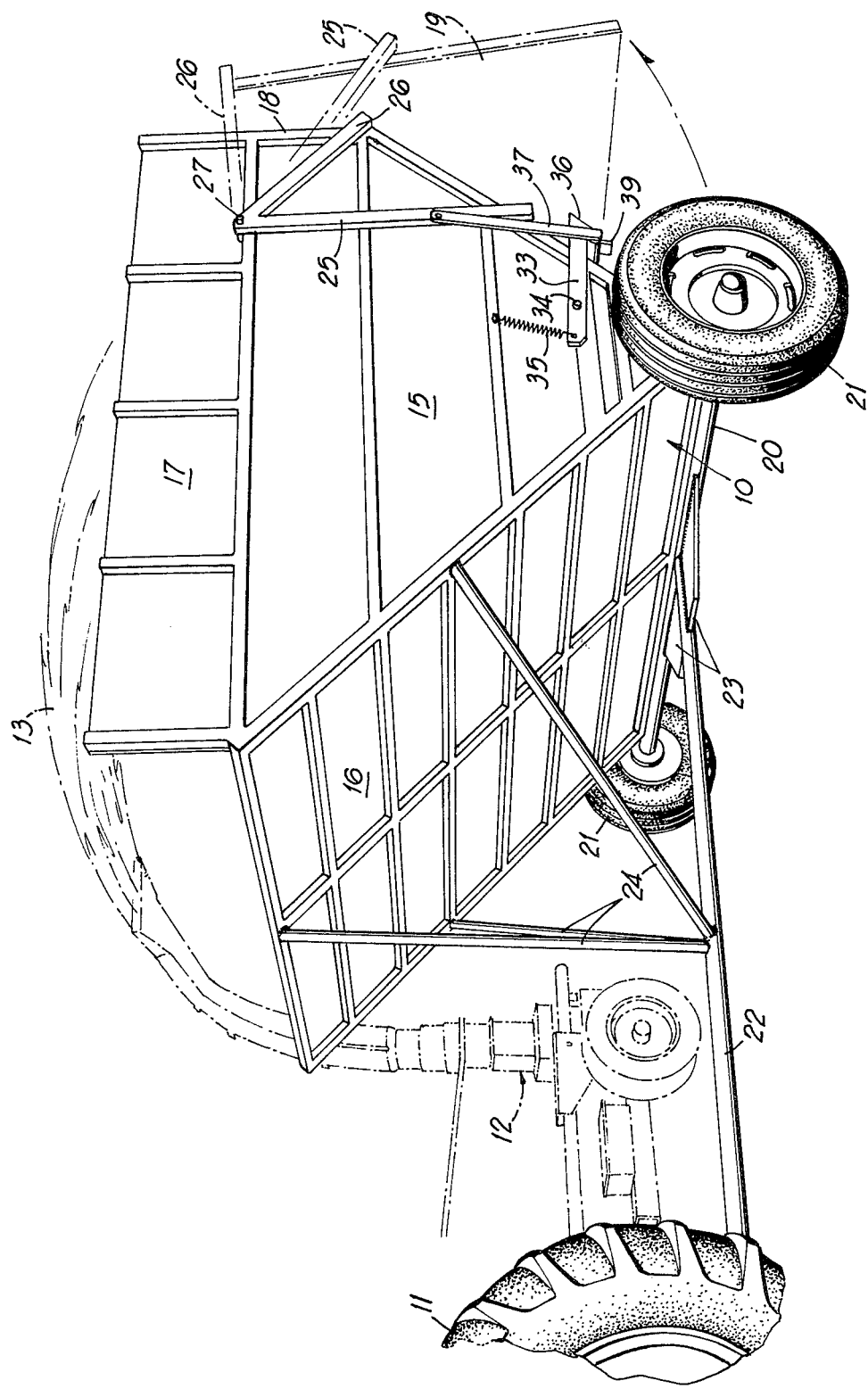
FIG. 1 is a perspective view of a silage wagon embodying the invention.

Referring to the drawings in detail, wherein like numerals designate like parts, the numeral 10 designates a silage wagon adapted to be drawn by a farm tractor 11 alongside a forage harvester 12 which continuously blows the forage 13 into the open top of the wagon 10.

The wagon 10 is generally triangular in side silhouette with its apex 14 arranged lowermost and its top open to receive the blown forage. Two vertical side walls 15 of the wagon are integrally joined to a forward inclined wall 16 to form a rigid body. A vertical extension 17 is preferably provided on one side wall 15 to act as a deflector for the blown forage so that the latter will not overshoot the wagon body.

Figure 2:
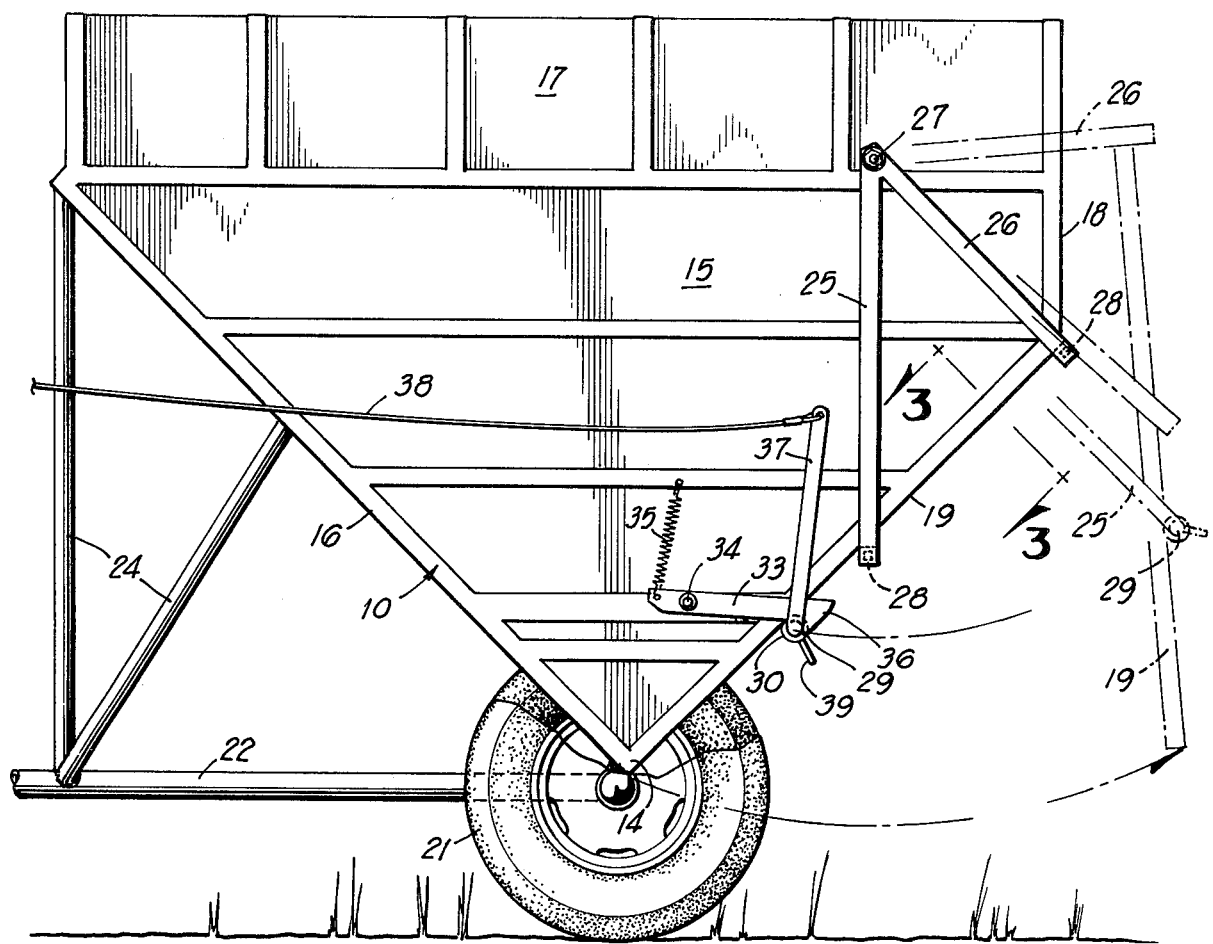
FIG. 2 is a fragmentary side elevation of the wagon.
Figure 3:
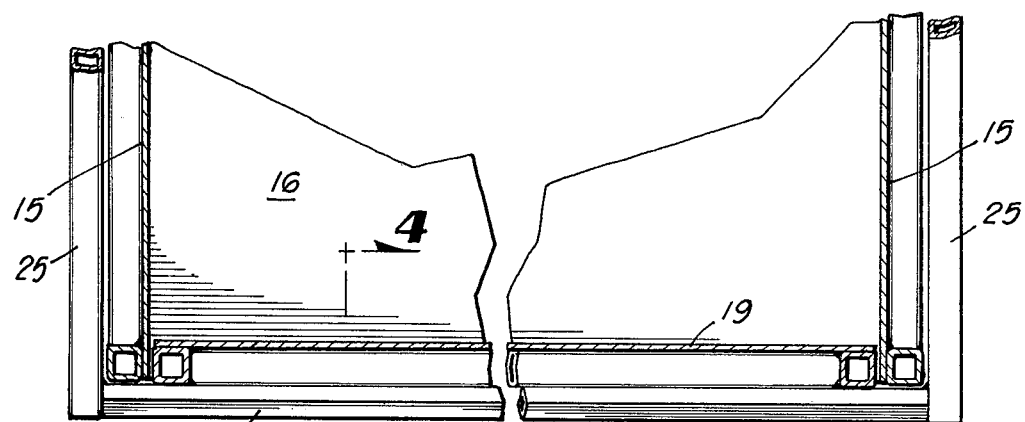
FIG. 3 is a fragmentary cross section taken through the rear dumping wall of the wagon on line 3—3 of FIG. 2.
Figure 4:
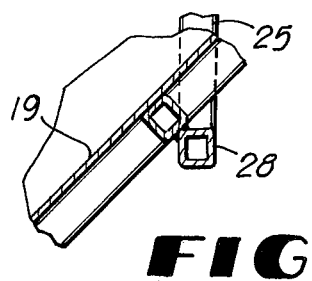
FIG. 4 is a fragmentary vertical section taken on line 4—4 of FIG. 3.

The wagon body further possesses a rear truncated vertical wall 18 or panel extending between the two side walls 15 above a rear inclined gravity-assisted dumping wall or door 19 which forms a key element of the invention. The forward and rear inclined walls 16 and 19 converge downwardly to the apex 14 and preferably form a right angle, as shown in FIG. 2.

A transverse support axle 20 for the body of the wagon is fixed as by welding to the forward wall 16 substantially at the apex 14 and suitable wheels 21 are rotationally mounted on the axle 20 outwardly of the side walls 15.

A horizontal towing tongue 22 is fixed rigidly to the axle 20 through gusset plates 23 and has its forward end coupled by hitch means, not shown, to the tractor drawbar. Preferably three rigid braces 24 are connected between the forward fixed wall 16 of the wagon and a mid-point on the tongue 22. The open top of the wagon 10 remains level at all times in the operation of the wagon, and as will be fully described, there is no need to tilt the wagon body to fully empty the contents thereof. Neither is there any need for shoveling the contents or for forcing out the contents by any power device.

The aforementioned rear inclined dumping wall 19 is supported at its opposite side edges by pairs of divergent arms 25 and 26 which lie immediately outwardly of the two side walls 15. The tops of the arms 25 and 26 are joined and are pivotally supported on two pivot pins 27, suitably attached to the wagon side walls near but forwardly of the rear truncated wall 18. The far ends of arms 25 and 26 are attached to two cross bars 28 which are welded to the rear wall 19 and bodily support it for swinging movement rearwardly and upwardly around the transverse axis defined by pivot pins 27. Since the pivot pins 27 are spaced forwardly of the rear wall 18 and above the top of the dump wall 19, when dumping occurs with the assistance of gravity acting through the load in the wagon, the wall 19 is forced to swing rearwardly and upwardly as shown by the arrow in FIG. 2 to a full open, near vertical position rearwardly of the truncated wall 18. This open position is shown in phantom lines in FIGS. 1 and 2. In such dumping position, the entire rear inclined portion of the wagon 10 is open and unobstructed so that the full contents in the wagon can slide freely therefrom with no necessity for shoveling or for power means to eject the contents. Also, the configuration of the wagon imparts to it a high volumetric capacity for a given size or weight.

A further advantage of the eccentric mounting of the hinge pins 27 above and forwardly of the rear swinging dump wall 19 is that the lower edge of the latter will have plenty of ground clearance in the fully open position and all intermediate positions. At no time is there any tilting of the wagon body proper, as previously noted.

A simplified and very positive latching means for the rear dumping wall 19 is provided. This means comprises a transverse latch bar 29 rotationally held in sleeves 30 welded to the rear wall 19 as by welding. The latch bar 29 is rotationally biased in one direction by retractile springs 31 and a stop lug or lugs 32 on the latch bar 29 which engage the wall 19 limit the biased rotation of the latch bar.

Coacting latches 33 on the opposite sides of the wagon are pivoted at 34 to the side walls 15 and are biased toward latching engagement with the bar 29 by springs 35. The rear heads 36 of the two latches are thus biased into latching engagement with the bar 29 at points outwardly of the endmost sleeve 30, and when the swinging dump wall 19 moves forwardly to the closed position, the latches are engaged by a simple camming action of the bar 29 against the heads 36.

Latch release arms 37 are fixed to the opposite ends of rotary latch bar 29 and have their tops connected with ropes 38 leading to convenient points on the tractor where they may be looped off. Latch release lugs 39 rigid with end portions of the latch bar 29 turn therewith to elevate and release the latch heads 36 against the holding action of springs 35 when the arms 37 are swung forwardly by pulling on one or both ropes 38. Upon release of the latches 23, as shown in FIG. 7, the inclined rear wall 19 is free to swing under the weight of the load to the full dumping position without any need for tilting the body of the wagon.

It may now be seen that the invention is characterized by extreme simplicity, ruggedness of construction, and ease and reliability of operation. It is comparatively inexpensive to manufacture. Gravity is made use of in a unique way to eliminate all need for wagon body tilting or power contents discharge means and also for power means to open the rear dump wall 19. The advantages of the construction over the known prior art should now be fully apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A self-emptying silage wagon comprising a wheeled wagon body adapted to be towed by a towing vehicle, said wagon body having substantially vertical side walls and forward and rear inclined downwardly converging walls forming substantially a bottom apex transversely of the wagon body between said side walls, means hingedly connecting the rear inclined wall to the wagon body at an elevation near the top of the rear inclined wall and forwardly of such top so that the rear inclined wall may swing to a near vertical contents dumping position near the rear of the wagon body responsive to gravity acting through the contents on the rear inclined wall, latching means for the rear inclined wall on the wagon body, said latching means being biased toward latching engagement with the rear inclined wall, remotely operated releasing means for said latching means operable from a towing vehicle, and said latching means comprising a biased rotational latching bar on the rear inclined wall extending transversely thereof, at least one remotely operated release arm secured to the rotational latching bar to turn it in a direction opposite to that in which it is biased, at least one pivoted latch member for said latching bar on the wagon body and being biased toward latching engagement with the latching bar, and a release element for said latch member on the latching bar and turning therewith in response to remote operation of said release arm.

2. A self-emptying silage wagon as defined in claim 1, and a top extension on one vertical side wall projecting above the tops of the opposite side wall and forward and rear walls to prevent over-shooting of material being blown into the top of the wagon body.

3. A self-emptying silage wagon as defined in claim 1, and a single transverse axle fixed to the bottom of the wagon body substantially along said bottom apex, supporting wheels secured to opposite ends of said axle, and a draft tongue means connected with said axle and extending forwardly substantially horizontally from the bottom of the wagon body.

4. A self-emptying silage wagon comprising a generally triangular wagon body having an open level top and an apex at its bottom on a transverse axis, the wagon body having substantially vertical side walls and forward and rear inclined walls rising from said apex, said forward and rear inclined walls forming the bottom of the wagon body and bearing the weight of material placed in the wagon body, means hingedly connecting at least one of said forward and rearward inclined walls to the wagon body near the top of the wagon body and near the top of such inclined wall so that the latter may swing open in response to the weight of material thereon to completely dump such material by gravity action without tilting the wagon body, releasable latching means for said one inclined wall on the wagon body and on said one inclined wall, and said latching means comprising a biased rotational latching bar on said one inclined wall extending transversely thereof, at least one remotely operated release arm secured to the rotational latching bar to turn it in a direction opposite to that in which it is biased, at least one pivoted latch member for said latching bar on the wagon body and being biased toward latching engagement with the latching bar, and a release element for said latch member on the latching bar and turning therewith in response to remote operation of said release arm.

* * * * *